(12) United States Patent
Ritter et al.

(10) Patent No.: US 7,533,634 B2
(45) Date of Patent: May 19, 2009

(54) PROCESS FOR USE WITH DUAL-FUEL SYSTEMS

(75) Inventors: Gregory W. Ritter, Gillette, WY (US); Terry A. Jones, Gillette, WY (US)

(73) Assignee: TGI, Inc., Gillette, WY (US)

( * ) Notice: Subject to any disclaimer, the term of this patent is extended or adjusted under 35 U.S.C. 154(b) by 230 days.

(21) Appl. No.: 11/689,296

(22) Filed: Mar. 21, 2007

(65) Prior Publication Data

US 2007/0157912 A1 Jul. 12, 2007

Related U.S. Application Data

(63) Continuation-in-part of application No. 11/099,726, filed on Apr. 6, 2005, now Pat. No. 7,225,763, which is a continuation of application No. 10/797,803, filed on Mar. 10, 2004, now Pat. No. 6,901,889.

(51) Int. Cl.
*F02B 3/00* (2006.01)
*F02M 21/02* (2006.01)

(52) U.S. Cl. .................... 123/27 GE; 123/525
(58) Field of Classification Search ............. 123/27 GE, 123/525, 527, 528, 672, 681, 682, 683, 684
See application file for complete search history.

(56) References Cited

U.S. PATENT DOCUMENTS

| | | | |
|---|---|---|---|
| 3,792,690 A | 2/1974 | Cooper | |
| 4,391,095 A | 7/1983 | Virk | |
| 4,535,728 A | 8/1985 | Batchelor | |
| 4,553,504 A * | 11/1985 | Duggal et al. | 123/25 J |
| 4,597,364 A | 7/1986 | Young | |
| 5,546,908 A | 8/1996 | Stokes | |
| 5,765,656 A | 6/1998 | Weaver | |
| 6,095,102 A | 8/2000 | Willi et al. | |
| 6,145,495 A | 11/2000 | Whitcome | |
| 6,189,523 B1 | 2/2001 | Weisbrod et al. | |
| 6,202,601 B1 | 3/2001 | Ouellette et al. | |
| 6,286,482 B1 * | 9/2001 | Flynn et al. | 123/435 |
| 6,422,015 B2 | 7/2002 | Long | |
| 6,550,430 B2 | 4/2003 | Gray | |
| 6,708,674 B2 * | 3/2004 | Benson | 123/557 |
| 2003/0077210 A1 | 4/2003 | Nau | |
| 2004/0103860 A1 * | 6/2004 | zur Loye et al. | 123/27 R |
| 2004/0123849 A1 | 7/2004 | Bryant | |
| 2004/0177837 A1 | 9/2004 | Bryant | |
| 2005/0072402 A1 * | 4/2005 | Zurloye et al. | 123/304 |

* cited by examiner

*Primary Examiner*—John T Kwon
(74) *Attorney, Agent, or Firm*—Marsh Fischmann & Breyfogle LLP

(57) ABSTRACT

A system and method is provided for use with a duel-fuel fumigation system. The system injects a gaseous-fuel flow into the air intake stream of a diesel engine. As presented, the system is operative to meter the gaseous-fuel flow into the diesel engine based on one or more engine parameters such as, for example, exhaust gas temperature, exhaust oxygen levels, engine speed, engine load and/or engine inlet pressure. Monitoring one or more engine parameters allows fine-tuning the flow of gaseous fuel into the engine and thereby prevents loss of engine power at high-end loads while maintaining favorable emission outputs over substantially the entire operating range of the engine.

19 Claims, 6 Drawing Sheets

PROCESS FOR USE WITH DUAL-FUEL SYSTEMS

CROSS REFERENCE TO RELATED APPLICATIONS

This application is a continuation in part of U.S. patent application Ser. No. 11/099,726 filed on Apr. 6, 2005, now U.S. Pat. No. 7,255,763, which is a continuation of U.S. patent application Ser. No. 10/797,803 filed on Mar. 10, 2004, now U.S. Pat. No. 6,901,889.

FIELD OF THE INVENTION

The present invention relates generally to duel-fuel engine systems. More particularly, the present invention relates to a fumigation system for controlling the injection of a gaseous-fuel into an air intake of a diesel engine.

BACKGROUND

Due to the high thermal efficiency achieved by compression-ignited engines (e.g., in comparison with spark-ignited engines), such engines are commonly utilized in industrial applications. Further, due to increasing fuel costs, such engines are also gaining popularity in the passenger vehicle and light truck markets. The high efficiency of compression-ignited engines, such as diesel engines, is due in part to the ability to use higher compression ratios than spark-ignited engines (i.e., gasoline engines) as well as the ability to control power output without a throttle. In the latter regard, the lack of a throttle eliminates throttling losses of premixed charges typical in spark-ignited engines thereby resulting in significantly higher efficiency at part load. However, compression-ignited engines and diesel engines in particular typically cannot achieve the low oxides of nitrogen ($NO_x$) and particulate emission levels that are possible with spark-ignited engines.

Diesel engines typically inject diesel fuel into the engine's combustion chamber when that chamber's piston is near the end of the compression stroke. The high pressure present in the chamber ignites the diesel fuel. Due to the injection mixture of diesel fuel and compressed intake air within the combustion chamber, a large fraction of the fuel exists at a very fuel-rich equivalence ratio. That is, the fuel and air in the combustion chamber are not necessarily a homogenous mixture. This may result in incomplete combustion of the diesel fuel, which tends to result in high particulate emissions. Furthermore, the fuel-rich equivalence ratio can also lead to high flame temperatures in the combustion process, which results in increased $NO_x$ emissions. As tougher environmental standards are being enacted for all internal combustion engines, users of diesel engines are looking for ways to lower emissions. One solution is to reduce the amount of diesel injected into the combustion chamber, which reduces the equivalence ratio and works to reduce particulate and $NO_x$ emissions. Such a reduction in injected diesel, however, reduces engine power.

Utilization of gaseous-fuels with diesel engines provides for more complete combustion of any diesel fuel consumed, can enhance fuel economy, and typically results in lower engine emissions. That is, in order to reduce particulate and $NO_x$ emissions levels from diesel engines and/or to increase fuel economy, such engines may be partially or completely converted for use with gaseous-fuels such as, compressed natural gas (CNG), liquid natural fuels (LNG) such as ethanol, and liquid or liquefied petroleum gas (LPG), such as propane. However, such gaseous-fuels typically do not alone have the centane value required to allow for their ignition through compression. Accordingly, diesel engines must be modified to use such fuels.

Methods for converting a diesel engine to consume gaseous-fuels typically fall into three categories. The first is to convert the engine to a spark-ignited engine; a second is to convert the engine to allow for the direct injection of gaseous-fuels into the combustion chamber with injected diesel; and a third is a dual-fuel technology, in which the gaseous-fuel is mixed with all or a portion of the intake air of the engine. As will be appreciated, the second and third methods utilize injected diesel (i.e., pilot diesel) to ignite the gaseous-fuel. In this regard, the combustion of the gaseous-fuel results in more complete combustion of the injected diesel. Furthermore, as the gaseous-fuel allows the engine to produce additional power less diesel is injected into the engine.

Conversion to a spark-ignition system and/or a direct gaseous-fuel injection system for utilizing gaseous-fuels with a diesel engine each typically require substantial modification to the diesel engine. Such modifications may include replacement of cylinder heads, pistons, fuel injection system and/or duplication of many engine components (e.g., injection systems). Accordingly, these systems are typically expensive and oftentimes unreliable. On the other hand, dual-fuel systems require little modification to existing engines.

Dual-fuel operation where gaseous-fuels are mixed with intake air prior to the introduction of that air-fuel mixture into the cylinders of the engine is known in the art as fumigation. That is, the mixture of gaseous-fuel and intake air is introduced into each cylinder of the engine during the intake stroke. During the compression stroke of the cylinder piston, the pressure and temperature of the mixture are increased. Near the end of the compression stroke, a small quantity of pilot diesel fuel from the engine's existing diesel fuel injection system is injected into the cylinder. The pilot diesel ignites due to compression and in turn ignites the mixture of gaseous-fuel and intake air. As will be appreciated, such fumigation systems may be retrofit onto existing diesel engines with little or no modification of the existing engine. Furthermore, engines using such fumigation systems may typically be operated in a dual-fuel mode or in a strictly diesel mode (e.g., when gaseous-fuel is not available).

SUMMARY OF THE INVENTION

The inventors of the present invention have recognized that dual-fuel systems typically suffer two disadvantages that have prevented widespread use of such systems. The first disadvantage is typically encountered at high load operating conditions when elevated temperature and pressure in the engine during the compression strokes makes the intake air/gaseous-fuel mixture susceptible to premature detonation or knocking. Furthermore, at such high loads, some gaseous-fuels (e.g., natural gas) lack the thermal energy (i.e., BTUs) required to maintain a desired power output of the engine. The second disadvantage is encountered at low engine load where the gaseous-fuel and air mixture may be too lean for satisfactory combustion. In this instance, fuel consumption may actually increase, as may the emissions of hydrocarbons (i.e., unburned gaseous-fuels) and particulates. Each of these problems may be broadly termed a gaseous-fuel metering problem of a gaseous-fuel flow volume to the engine.

Both of the above noted disadvantages are particularly acute in diesel engines, which run at varying load levels during operation (e.g., on-road and off-road vehicles). Such engines require the volume of gaseous-fuel injected into the intake airflow to vary with the varying requirements or demands of the engine in order to maintain desired power and emission outputs.

The inventors have realized that metering based on a load level of a diesel engine provides a good starting point for fine tuning a gaseous-fuel flow in order to achieve improved emissions and/or enhanced fuel economy over a wide range of operating conditions. For instance, in one method for metering the volume of a gaseous-fuel flow based on the varying requirements or demands of the engine, a fumigation system may utilize a valve that is actuated in response to boost pressure of a turbocharger interconnected to a diesel engine. In this regard, as a load on the diesel engine increases, the turbocharger generates increased boost pressure. Once this boost pressure reaches a predetermined level, the valve may be partially opened to permit gaseous-fuel to be supplied to the air intake. As the boost pressure further increases, the valve opens further to allow more gaseous-fuel flow to the intake. However, in this method no gaseous-fuel is supplied at low load levels (e.g., idle) as no boost pressure is generated at such load levels. Therefore, the system fails to provide any emissions benefits at low load levels. Furthermore, at high load levels, where the boost pressure may fully open such a valve, excess gaseous-fuel may flow into the intake air stream, which may result in knocking and/or lowered engine performance. In this regard, strict load-based metering is often, by itself, inadequate for diesel engines that experience varying load levels.

Accordingly, the inventors have recognized that additional or alternate means for metering the volume of a gaseous-fuel flow in order to fine-tune that flow volume may, in many instances, be desirable. In this regard, it has been determined that by monitoring one or more engine parameters such as, for example, exhaust gas temperature, exhaust oxygen levels, and/or engine speed, the flow volume of the gaseous-fuel may be adjusted (i.e., in conjunction with or independent of load based metering) to prevent loss of power at high-end loads while maintaining favorable emission outputs over substantially the entire operating range of the engine.

According to a first aspect, a gaseous-fuel fumigation system for interconnection to a diesel engine is provided. The system includes a first valve disposed in a flow path between a gaseous-fuel supply and an air intake stream of a diesel engine. The first valve is operative to regulate a flow volume of gaseous-fuel (i.e. from the gaseous-fuel supply) through the flow path based on a load level associated with the engine. A second valve, disposed in series with the first valve in the flow path is operative to further regulate the flow volume of the gaseous-fuel through the flow path prior to the gaseous-fuel reaching the air intake stream of the engine. The second valve is operative to further regulate the flow volume based on, at least in part, an oxygen content of exhaust gases in an exhaust stream of the engine.

Various refinements exist of the noted features in relation to the subject first aspect of the present invention. These refinements and/or additional features may exist individually or in any combination. For instance, the gaseous-fuel system may be interconnected to any of a variety of differently configured diesel engines. That is, such a fumigation system may be incorporated into heavy industrial applications/engines (e.g., railroad engines), power generation systems and/or on and off-road diesel vehicles. Furthermore, such a system may be incorporated into original equipment manufacturer (OEM) equipment, or, such a system may be retro-fit onto an existing diesel engine. Additionally, it will be noted that the gaseous-fuel may be injected into the air stream of an engine in any appropriate manner. In this regard, the flow path may be directly coupled to an air intake stream in order to directly inject fuel into that stream, or, and outlet of the flow path may be disposed relative to an air intake such that the gaseous-fuel is drawn into the engine with ambient air.

As used herein, the term valve is meant to include any mechanism for varying the flow of a fluid through a flow path. Such valves include, without limitation, mechanical valves operative to restrict a cross-sectional area of a flow path as well as pressure regulating valves that are operative reduce the pressure and/or volume of a gas passing across the valve. Accordingly, the pressure of the gaseous-fuel supply and/or the size (i.e., cross-sectional size) of the flow path may be selected for a particular application.

It will be noted that while the first and second valves may be disposed in series, the order of those valves is unimportant. In this regard, the first and second valves may be operated independently and a total flow volume passing through the two valves will be the same irrespective of their order. Generally, however, the first valve will establish a first flow volume and the second valve will act as a leaning valve that is operative to establish a second flow volume between zero and 100% of the first flow volume. The second flow volume is then injected into the intake air stream. In this regard, the second valve can be utilized to prevent any gaseous-fuel flow from reaching the diesel engine if circumstances dictate eliminating the supply of gaseous-fuel.

As noted, the first valve regulates the flow volume of the gaseous-fuel in relation to a load level associated with the engine. In one particular embodiment, this load level is determined from boost pressure produced by a turbo-charger attached to the diesel engine. In this regard, the boost pressure may be utilized to open a spring-actuated valve to variably open a flow path through the valve. As will be appreciated, as the engine load level increases, the boost pressure also increases. This increased boost pressure may further open the first valve such that increased flow volume of gaseous-fuel may pass through. As will be appreciated, use of such a spring-actuated valve may allow for preventing the passage of any gaseous-fuel through the valve until a predetermined boost pressure is achieved. Furthermore, the valve may be adjustable to allow a user to establish the engine load level necessary to initially and/or fully open the valve. Though discussed in relation to a spring-actuated valve, it will be appreciated that other valve types may be utilized. For example, an electronically actuated valve (e.g., using a stepper motor) operative in relation to the engine's governor and/or an RPM sensor may also be utilized to establish a gaseous-fuel flow volume based on such an engine load level.

In order for the second valve to regulate (e.g., fine tune) the load based gaseous-fuel flow volume based on an oxygen content of exhaust gases, the system will typically include an oxygen sensor disposed within an exhaust stream of the engine. In this regard, a controller may receive an output signal from a sensor and/or convert such a signal into an oxygen content. This controller may then control the operation of the second valve in order to increase or decrease the volume of the gaseous-fuel flow through the second valve and thereby the flow volume reaching the air intake stream of the engine.

To fine tune the gaseous-fuel flow, the controller may further include programming (e.g., software, hardware and/or firmware) that maintains one or more predetermined operating conditions for the engine. In this regard, the controller may be operative for engine performance and/or emissions purposes to maintain at least a predetermined minimum oxygen content in the oxygen stream. For example, if the exhaust stream is oxygen depleted (i.e., beneath a predetermined desired amount), unburned hydrocarbons are passing through the engine and hence, increasing emissions outputs. The controller may be operative to adjust the gaseous-fuel flow volume through the second valve (e.g., reduce the volume) to reestablish a desired oxygen content in the exhaust stream. Accordingly, ensuring that at least a minimum desired oxygen content is present within the exhaust gases allows for ensuring complete combustion of the gaseous-fuel and/or diesel fuel within the engine.

According to another aspect of the invention, a gaseous-fuel fumigation system for interconnection to a diesel engine is provided wherein the volume of a gaseous-fuel flow through a flow path between a gaseous-fuel supply and an air intake stream is controlled based on the oxygen content of an exhaust stream of the engine. More particularly, the system includes an oxygen sensor disposed within the exhaust stream of the engine and a controller operative to adjust a first valve in the flow path to maintain a predetermined minimum oxygen content in the exhaust stream. In a further embodiment, the controller includes an oxygen content adjuster that is operative to allow selective setting of one or more predetermined minimum oxygen contents. As will be appreciated, this allows, for example, a user to select a minimum oxygen content based on one or more engine-specific parameters. Alternatively, the controller may select a minimum oxygen content based on one or more operating conditions. This allows customizing such a fumigation system for use with a wide variety of differently configured diesel engines.

Variations and refinements exist of the present aspect. Such variations and refinements may exist in any combination. For instance, the controller may be a stand-alone unit or incorporated into one or more existing processors associated with the engine. What is important is that the controller is operable to determine an oxygen content from the sensor output and provide an output signal operative to adjust (e.g., open and/or restrict) a valve disposed within the flow path between a gaseous-fuel supply and an air intake stream of the engine.

In order to set a predetermined minimum oxygen content for the exhaust stream of an engine, the oxygen sensor disposed within that exhaust must be operable to accurately read a range of oxygen contents for a wide range. In this regard, a wide band oxygen sensor is utilized that is capable of accurately identifying oxygen content between about 1% and about 22%. Furthermore, use of such an oxygen sensor allows for establishing and maintaining a desired oxygen content within the exhaust stream. As will be appreciated, oxygen sensors utilized for automotive catalytic converter applications utilize an oxygen sensor having a preset value. Typically, the operation of the engine is adjusted to be within a percentage value of the preset value of the oxygen sensor. This results in cyclic engine operation. That is, the exhaust gases are either above or below the predetermined set point, but never necessarily converge on that set point. The wide band oxygen sensor allows for more accurate oxygen sensing and therefore the ability to establish and maintain an oxygen level within an exhaust stream (i.e., non-cyclic operation).

According to another aspect of the present invention, a method for operating a gaseous fumigation system interconnected to a diesel engine is provided. The method includes establishing a first fluid flow of gaseous-fuel based on a load level of a diesel engine. An oxygen content in the exhaust stream of the engine is identified and, based on that oxygen content, the flow volume of gaseous-fuel is regulated to establish a second flow volume that is between zero and 100% of the first flow volume. The second flow volume is then injected into the air intake stream of the diesel engine. This method allows for the fine-tuning (i.e., metering) of a load based gaseous-fuel flow such that performance and/or emissions outputs may be maintained at high and/or low load levels in a diesel engine.

The present method may be utilized with diesel engines that run at constant operating speeds (i.e., point source engines) and/or with diesel engines having varying load requirements (e.g., on and/or off-road vehicles). In the latter regard, the load level of the diesel engine may fluctuate in an almost continuous manner. Accordingly, the first flow volume will likewise fluctuate. Furthermore, the regulation of the first gaseous-fuel flow will likewise fluctuate to maintain one or more desired parameters including, for example, the oxygen content of the exhaust, engine speed and/or exhaust gas temperatures. In this regard, it will be noted that one or more variables may be monitored to provide a system that can shut down gas injection to the engine when any of a number of predetermined variables are exceeded.

In this regard, logic within a controller may monitor one or more such variables such that gaseous-fuel flow may be adjusted accordingly. For example, if an exhaust gas temperature exceeds a predetermined maximum amount, the gaseous-fuel supplied to the diesel engine may be reduced. If the exhaust gas temperature continues to exceed the predetermined maximum value (i.e., the system will not stabilize at a desired value), the gaseous-fuel flow may be shut off entirely. Similar systems may be set up for engine rpm such that the engine doesn't over-speed, which may damage the engine. As presented, the method provides for a multiple redundancy system for preventing damage to an engine utilizing a fumigation system.

According to another aspect of the invention, a gaseous-fuel fumigation system is provided wherein a volume of gaseous fuel flow through a flow path between a gaseous fuel supply and an air intake stream is controlled utilizing a single electronically controlled valve. The flow path through the valve is controlled by a controller. This controller is electrically interconnected to an oxygen content sensor that is operative to generate an output that is indicative of an oxygen content of an exhaust stream of an engine. The controller is also interconnected to a pressure sensor that is fluidly interconnected to the input of the diesel engine. This pressure sensor is operative to generate an output signal that is indicative of the input pressure into the engine. In one arrangement, the pressure sensor is fluidly connected to a turbocharger of the engine. In any arrangement, the controller receives oxygen content information and pressure information associated with the input pressure into the engine, which may correspond to boost pressure of the turbocharger. The controller may then utilize such information to generate control signals for controlling the flow of gaseous fuel through the valve. Such a system allows for controlling the gaseous fuel flow based on engine load level and oxygen content without requiring mechanical connection of a turbocharger to a fluidly actuated valve assembly.

In one arrangement, the controller may utilize oxygen content information and pressure information to control different operating ranges of the engine. For instance, at low operating speeds or powers, the exhaust stream may have more than a predetermined minimum oxygen content. Accordingly, the controller may, while the oxygen content is above the minimum level, utilize only pressure information to generate control signals for controlling the valve and, hence, gaseous fuel flow to the engine. In contrast, when the oxygen content of the exhaust falls below the predetermined minimum, the controller may utilize the oxygen content information alone and/or in combination with the pressure information to generate control signals for controlling the valve. Stated otherwise, the controller is operative to generate control signals based on a first engine operating parameter for a first set of operating conditions and generate control signals based on a second engine operating parameter for a second set of operating conditions. It will be appreciated that, in addition to exhaust oxygen content and engine input pressure, other engine operating parameters may be utilized including, without limitation, rpm, exhaust temperature, gaseous fuel parameters (e.g., BTU, centane, etc).

In another arrangement, the controller can also use pressure from sensor to adjust the oxygen set point up or down to achieve a non-linear result of gaseous fuel flow. Alternatively, the controller may be programmed to provide linear increases of gaseous fuel based on input pressure from the transducer. In either arrangement, limitations may be imposed by exhaust oxygen presets. This allows for proportional or non-proportional fuel flows as may be required by a specific application.

The inventors have also recognized that dual-fuel systems are often susceptible to engine knocking at high load operating conditions and/or in response to rapid changes in operating conditions of the engine. Such engine knocking is an uncontrolled combustion process that can damage engines and is typically caused by elevated temperature and pressure in the engine during the compression strokes that makes the intake air/gaseous-fuel mixture susceptible to premature detonation (i.e., engine knocking).

The occurrence of engine knocking in dual-fuel systems is particularly acute for engines that run at varying load levels during operation (e.g., on-road and off-road vehicles). That is, due to the changes in operating conditions, the load applied to the engine may increase or decrease rapidly. Accordingly, the mixture of gaseous fuel and intake air that was appropriate prior to a change in operating conditions may be excessively rich or excessively lean after the change in operating conditions. This may lead to the mixture being out of balance for the current operating conditions and thus the initiation of engine knocking. Further, such engine knocking may increase in intensity (e.g., oscillation due to harmonic amplification) and can result in the engine shaking and/or jumping (i.e., rough engine operation) while the gaseous fuel/intake air mixture is readjusted for the current operating conditions.

To prevent such rough engine operation, which can temporarily reduce engine performance and/or damage the engine, the inventors have determined it is desirable to identify engine knocking at early stages and rapidly readjust the ratio of gaseous fuel to intake air. Accordingly, systems and methods (i.e., utilities) are presented herein for operating a dual-fuel system while reducing the occurrence, duration and/or intensity of engine knocking conditions. More specifically, the utilities herein utilize an engine knock sensor to identify engine knocking conditions such that remedial measures may be taken.

According to another aspect, a gaseous fuel fumigation system for use with a diesel engine is provided. The system includes a valve disposable in a flow path between a gaseous fuel supply and an air intake of a diesel engine. The valve is operative to regulate a flow volume of gaseous fuel through the flow path. The system further includes a knock sensor that is operative to monitor a motion level (e.g., vibrations and/or acceleration) of the diesel engine and generate an output signal that is indicative of the motion level. Finally, the system includes a controller that is operative to receive the output signal from the knock sensor and compare the output signal to at least a first threshold value. If the output signal of the knock sensor exceeds the first threshold value, the controller generates control signals that are operative to: move the valve from its current or initial open position, which defines a first gaseous fuel flow volume, to a substantially closed position, which defines a second gaseous fuel flow volume, and back to a reopened position, which defines a third gaseous fuel flow volume. Stated otherwise, the controller is operative to cycle the valve from its current open position to a substantially or fully closed position and back to a reopened position. Such movement may be substantially continuous and may permit reestablishing gaseous-fuel flow based on present engine operating conditions.

Cycling of the valve allows the engine to momentarily run in near or full diesel mode. That is, while the valve is substantially closed, the engine operates free or substantially free of gaseous fuel flow. Accordingly, while running in full/near full diesel mode, the knocking conditions caused by an out of balance mixture of gaseous-fuel and intake air are eliminated. Accordingly, the valve may be reopened based on the present operating conditions of the diesel engine. In this regard, it will be appreciated that the flow volumes associated with the initial valve position and the reopened valve position may be different. By cycling the valve upon initially identifying the knocking conditions, visibly rough engine operation may be totally avoided. Furthermore, as the valve is reopened almost immediately after being closed, the benefits of dual fuel operation are only briefly interrupted.

In one arrangement, the position of the valve is adjusted based on an oxygen content of the exhaust stream of the diesel engine. In such an arrangement, the system may further include an oxygen sensor that is disposable within the exhaust path of the diesel engine. An oxygen content value generated by this oxygen sensor may be received by the controller. Accordingly, the controller may utilize the oxygen content value to control the position of the valve. Likewise, the controller may utilize this oxygen content value to establish a reopened position for the valve. In addition to an oxygen content of the exhaust, the controller may also utilize an engine load level to control/reestablish a position of the valve. Such engine load level may correspond to, for example and without limitation, engine rpm and/or boost pressure of a turbo-charger. In one arrangement, a boost pressure sensor in fluid communication with the turbocharger may be utilized to provide a signal to the controller that is indicative of boost pressure. In any arrangement, an appropriate gaseous fuel flow may be established for the present/current operating conditions of the engine.

The knock sensor may be any sensor that is operative to provide an output indicative of movement associated with engine knocking. For instance, various different accelerometers and/or velocity sensors may be utilized. Furthermore, it will be appreciated that a plurality of such sensors may be utilized. In this regard, a knock sensor may be positioned adjacent to each cylinder of the engine to provide information regarding early states of engine knocking. In one arrangement, the knock sensor is a piezoelectric device. However, it will be appreciated that other types of devices may be utilized, without limitation. In any case, it may be desirable that the knock sensor is attached to a solid surface of the engine (e.g., head and/or block) such that, for example, high frequency oscillations (e.g., vibrations) associated with engine knocking may be detected.

The threshold value to which the output signal the knock sensor is compared may be generated by the controller during the operation of the engine. For instance, the threshold value may be determined as an average motion value over a preceding and predetermined period of time. Alternatively, the threshold value may be a predetermined threshold value that may be stored in a storage structure. In this regard, the threshold values may include, inter alia, tabulated threshold values and/or threshold value equations for calculating an appropriate threshold based on one or more current operating conditions of the engine.

According to another aspect of the present invention, a method for use of a gaseous fuel fumigation system with a diesel engine is provided. The method includes establishing a gaseous fuel flow through a valve disposed between a gaseous fuel supply and an air intake stream of a diesel engine. The valve is operative for regulating a volume of the gaseous fuel flow. A motion level of the engine is monitored and, upon the motion exceeding at least one threshold value, the valve is substantially closed and reopened to at least partially interrupt the flow of gaseous fuel to the diesel engine.

Various refinements exist of the noted features in relation to the present aspect. These refinements and/or additional features may exist individually or in any combination. For instance, the valve may be entirely closed and then reopened, or the valve may be substantially closed in relation to its initial flow volume. What is important is that the flow volume of gaseous fuel to the diesel engine is substantially reduced to establish full or rear full diesel operation to reduce the motion level of the engine (e.g., to eliminate knocking conditions).

Generally, monitoring a motion level of the engine includes generating an output signal from a motion sensor that is attached to the engine. This output signal may then be compared to one or more threshold values to determine if the current motion of the engine is acceptable and/or exceeds the threshold value. If the output signal exceeds the threshold value (e.g., by a predetermined amount), remedial measures may be taken. That is, the valve may be cycled to temporarily interrupt the supply of gaseous fuel to the engine. In this regard, closing and reopening the valve may include generating a first valve control signal that is operative to move the valve from an initial valve position to a substantially closed position and generating a second control signal that is operative to move the valve from the substantially closed position to a reopened position. The reopened position of the valve may be based on one ore more current operating conditions of the engine. In one arrangement, the reopened position may be defined based at least in part on the oxygen content of the exhaust gas of the engine and/or based on a engine load value.

In any of the above aspects, the emissions of a diesel engine may be significantly reduced without affecting the power output of that engine. This is due in part to more complete combustion of diesel fuel within the engine due to the inclusion of the gaseous-fuel as well as the reduction of diesel fuel utilized by the engine. Of note, any gaseous fuel may be utilized including, without limitation, natural gas, methane, propane, hydrogen, vaporized ethanol, vaporized methanol, and/or any other gas or vapor having adequate combustion properties. Further, it will be noted that the above-noted fumigation systems may be set to minimize the diesel fuel utilized by an engine. This has significant benefits in natural gas and/or methane gas well production applications. In such applications, natural gas engines or diesel are often utilized for pumping and/or compressing gas from wells into pipelines. Due to the low BTU value of the natural gas, such natural gas engines are often considerably larger and more expensive than a diesel engine having a similar power rating. In this regard, it is desirable to utilize diesel engines though these diesel engines may be remotely located and require frequent servicing (e.g., replenishment of diesel fuel). By incorporating a fumigation system onto these remotely located engines such that they utilize gaseous-fuel, of which there is a ready supply, the rate of diesel usage may be significantly reduced thereby lowering the service requirement of such engines.

BRIEF DESCRIPTION OF THE DRAWINGS

FIG. 2b illustrates a second cross-sectional view of the boost-pressure valve of FIG. 2a;

DETAILED DESCRIPTION

Figure 1:
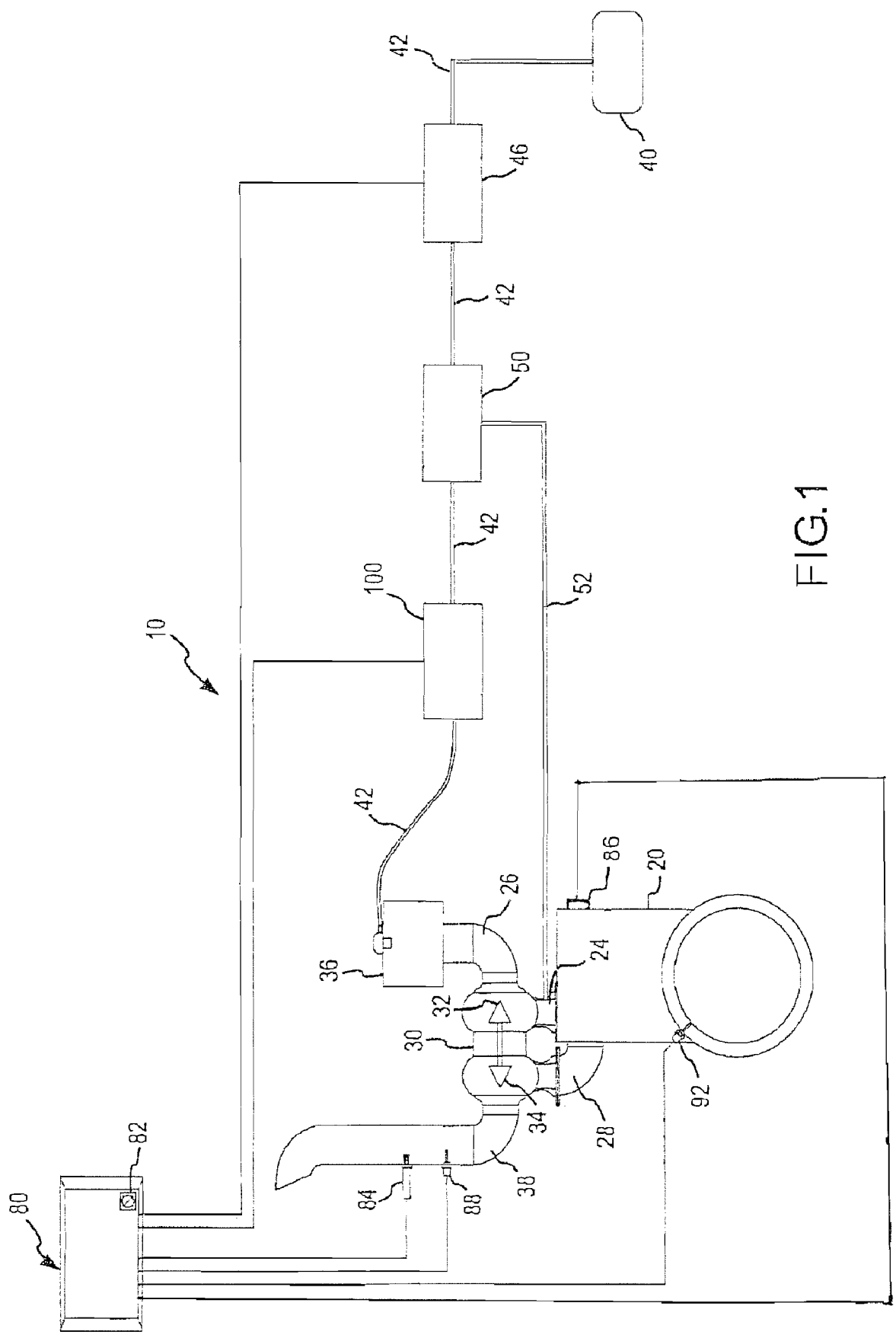
FIG. 1 is a schematic view of a first embodiment of a fumigation system.

The present invention will now be discussed in relation to the accompanying drawings, which at least partially assist in illustrating its various pertinent features. FIG. 1 shows a schematic view of a first embodiment of a dual-fuel fumigation system 10 interconnected to a turbocharged diesel engine 20. The fumigation system 10 is applicable to a variety of diesel engine applications and may be utilized in any of a variety of environments where diesel engines are utilized. For example, the fumigation system 10 may be utilized with stationary power generation systems as well as on-road and off-road diesel powered vehicles. That is, the system may be utilized with diesel engines designed to operate at a set load level as well as with diesel engines having varying load requirements due to, for example, idling needs, acceleration needs, cruising needs, etc. Furthermore, it will be noted that the fumigation system 10 is discussed in relation to its applicability to turbocharged diesel engines, however, it will be appreciated that certain aspects of the invention are not limited to such applications.

The particular internal characteristics of the turbocharged internal combustion engine 20 are not of particular importance for the present invention. In this regard, it will be noted that the fumigation system 10 may be interconnected to a multitude of differently configured diesel engines 20. As shown, the engine 20 includes a turbocharger 30, which provides pressurized intake air to the engine 20 during operation at load. The turbocharger 30 includes an impeller 32 that is interconnected to a turbine 34. The impeller 32 is disposed within an air inlet line 26 of the engine 20 while the turbine 34 is disposed within an exhaust output 38 of the engine 20. As is conventional, the turbine 34 receives exhaust gas from an exhaust manifold 28 of the diesel engine 20. The exhaust gas rotates the blades of the turbine 34, which causes the impeller 32 to likewise rotate, thereby compressing air supplied to the impeller 32 through the air inlet line 26. The compressed air is discharged from the impeller 32 through the inlet manifold 24 where it is supplied to air inlet ports within the diesel engine 20. By means of the turbocharger 30, air supplied to the engine 20 is compressed, which enhances the performance of the engine 20.

The exact internal configuration of the engine diesel 20 is unimportant for the present invention as the gaseous fumigation system 10 disclosed herein may be interconnected to a variety of differently configured engines. Typically, the engine 20 will include a number of cylinder assemblies, each having an intake port, an exhaust port, and a fuel injector therein. Each cylinder assembly will further include a piston for compressing gasses within the cylinder. The fuel injector is utilized to inject diesel fuel into the cylinder (e.g., when the piston is at or near top dead center), causing combustion of the fuel/air mixture.

Irrespective of the exact configuration of the diesel engine 20, the engine 20 may be equipped and/or retrofit with the dual-fuel fumigation system 10. As shown in FIG. 1, the fumigation system includes a gaseous-fuel supply 40 for providing a fuel flow to the air intake 36 of the engine 20 via a gas supply conduit 42. Of note, the outlet of the gas supply conduit 42 may be disposed relative to the air intake 36 such that gas emitted from the end of this gas supply conduit 42 may be drawn into the air intake 36. In this regard, the gaseous-fuel may pass through a filter associated with the air intake 36 prior to entering the engine 20. As will be discussed herein, a series of three valves are disposed between the gaseous-fuel supply 40 and the air intake 36. It will be noted that other embodiments, the fumigation system may utilize the valves in different order and/or combine the functioning of two or more valves into a single valve assembly.

In the present embodiment, the three valves include a lock-off valve 46, a boost-pressure valve 50, and a leaning valve 100. The boost-pressure valve 50 is a mechanical valve that opens in relation to boost-pressure received from the turbocharger 30 via a boost-pressure conduit 52. The lock-off valve 46 and the leaning valve 100 are interconnected to a programmable electronic control unit 80. As shown, the programmable electronic control unit (ECU) 80 is further interconnected to an oxygen sensor 84 disposed within the exhaust output 38 of the engine 20, an exhaust gas temperature (EGT) sensor 88, which is also disposed within the exhaust output 38, and an RPM sensor 92, which is operative to determine the engine speed at the flywheel. Further, a knock sensor for detecting motion levels of the engine 20 is also interconnected to the ECU 80, as will be discussed herein.

The lock-off valve 46 is operative to prevent any gas flow between the gaseous-fuel supply 40 and the air intake 36 when the engine 20 is not operating. That is, when the electrical system of the engine 20 is inactive, the lock off valve 46 is closed to prevent the typically pressurized gaseous-fuel 40 from traveling through the gas supply conduit 42. Of note, the gaseous-fuel supply 40 may further include regulators in order to provide a predetermined gas pressure to the conduit 42. Furthermore, it will be noted that the size of the gas supply conduit 42 and/or pressure of the gaseous-fuel may be selected to provide a desired flow rate/volume based on one or more requirements of the engine 20.

Figure 2A:
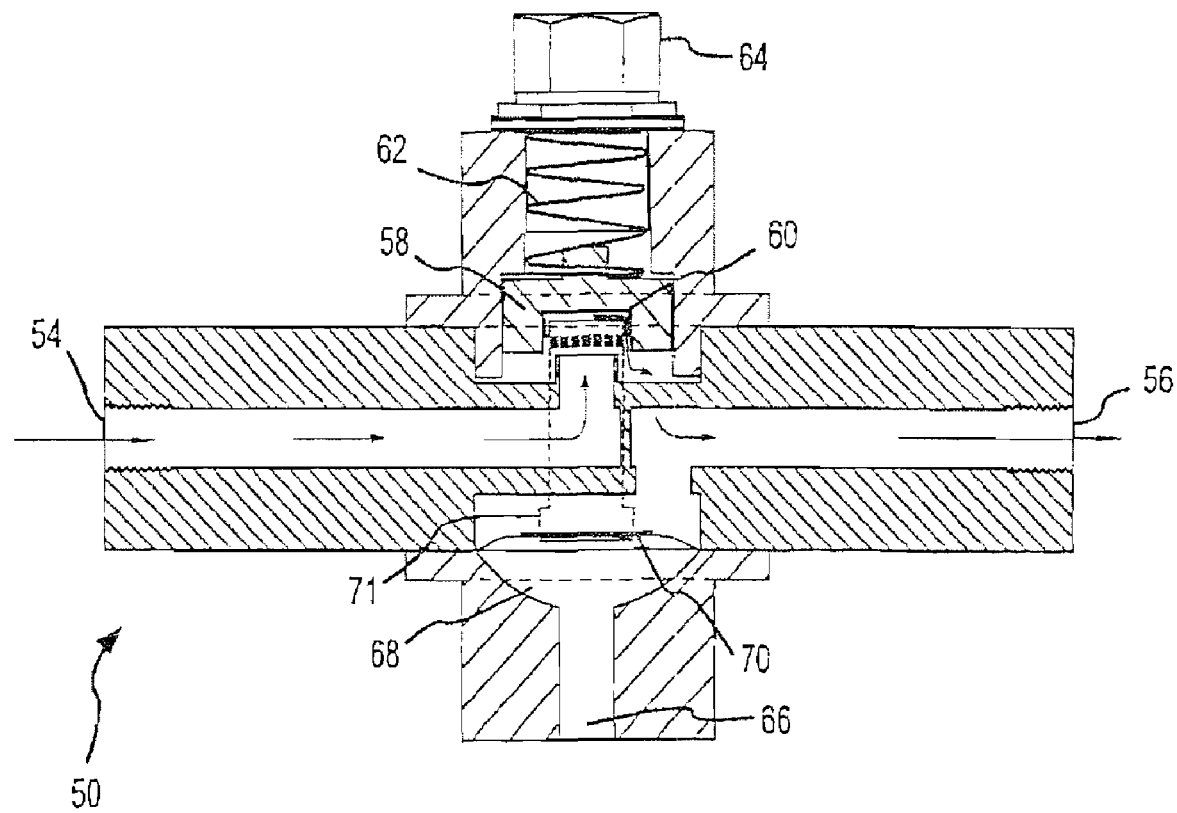
FIG. 2a illustrates a first cross-sectional view of a boost-pressure valve utilized with the system of FIG. 1.

Upon starting the engine 20, the lock off valve 46 is opened to allow gaseous-fuel flow between the gas supply 40 and the boost-pressure valve 50. FIG. 2a shows a cross-sectional view of the boost-pressure valve 50. As shown, the boost-pressure valve 50 includes a gas inlet 54 and a gas outlet 56. Disposed between the inlet 54 and the outlet 56 is a diaphragm operated valve assembly. The valve assembly includes a valve body 58, a valve seat 60, a spring 62, and a spring tension adjuster 64. As shown, the valve body 58 and valve seat 60 are generally cylindrical and are disposed in a mating relationship when boost pressure is not present. That is, the spring 62 maintains the valve body 58 against valve seat 60 in the absence of boost pressure from the turbocharger 30, thereby preventing flow of gas through the main portion of the boost-pressure valve 50.

The boost-pressure conduit line 52 has a first end interconnected to the turbocharger 30 and a second end interconnected to the boost-pressure inlet 66 of the boost-pressure valve 50. The boost-pressure inlet 66 is connected to a pressure chamber 68 that is partitioned by a flexible diaphragm 70. The pressure within the pressure chamber 68 from the turbocharger 30 applies upward pressure to the diaphragm 70. The diaphragm 70 is interconnected to the valve body 58 by a pushrod 71. When upward pressure is sufficient, the diaphragm 70 moves upward and the pushrod 71 lifts the valve body 58 from the valve seat 60, thereby opening a fluid path between the gas inlet 54 and outlet 56. That is, when the boost pressure in the pressure chamber 68 overcomes the force applied to the valve body 58 by the spring 62, gaseous-fuel from the gaseous-fuel supply 40 may be delivered through the boost-pressure valve 50 and on to the air intake 36 via the leaning valve 100. As will be appreciated, as the boost pressure increases, the spring 62 and valve seat 60 may be further displaced, thereby progressively increasing the flow of gaseous-fuel through the boost-pressure valve in response to changes in engine operating conditions. Further, the adjustor 64 allows for setting a minimum boost pressure that will open the boost-pressure valve 50.

Figure 2B:
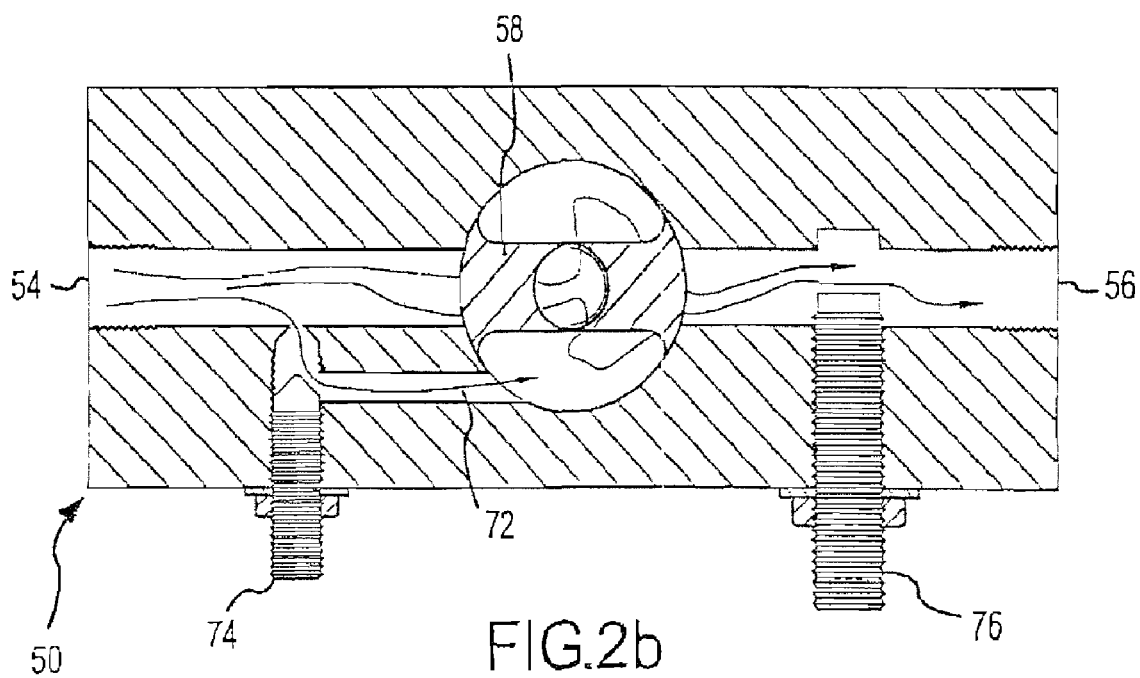

At low load levels, the diesel engine 20 does not produce boost pressure and likewise cannot open the boost-pressure valve 50. In this regard, at low engine loads such as idle, no gaseous-fuel is able to pass through the main portion of the boost-pressure valve 50. However, the present configuration of the boost-pressure valve 50 includes an idle bypass port 72. As shown in FIG. 2b, a portion of the gas flow passing through the boost-pressure valve 50 may pass through the idle bypass port 72, through the main valve body and through the outlet 56 while the valve body 58 is seated on the valve seat 60. Furthermore, in the embodiment shown, the idle bypass port 72 includes an idle bypass adjustment screw 74. This idle bypass adjustment screw 74 allows for varying the flow of the gaseous-fuel through the boost-pressure valve 50 when the boost pressure is insufficient to open the main valve assembly. In this regard, gaseous-fuels may be provided to the engine at low load levels such that the benefits of the gaseous-fuel injection (e.g., reducing $NO_x$ and/or particulates) may be realized at low load settings. Stated otherwise, the idle bypass port 72 may be set to maintain a minimum gas flow through the boost pressure valve 50.

FIGS. 2a and 2b illustrate the flow of the gaseous-fuels through the boost-pressure valve 50. As shown in FIG. 2b, the gaseous-fuel enters the gas inlet 54 from the left side of the valve 50 and passes through the main valve assembly. Returning to FIG. 2a, it will be noted that when the valve assembly is open, the gaseous-fuel passes up through the center portion of the valve 50 and out through the outlet 56. Furthermore, it will be noted in FIG. 2b that the boost-pressure valve 50 includes a fuel mix adjuster screw 76 that is operative to limit the maximum flow of the gaseous-fuel through the boost-pressure valve 50. In this regard, the boost-pressure valve 50 may be utilized with engines having varying flow requirements. That is, when the boost pressure fully opens the main valve assembly, the fuel mix adjuster screw 76 may be set for a particular engine such that a desired maximum flow through the boost-pressure valve 50 is established.

Figure 3:
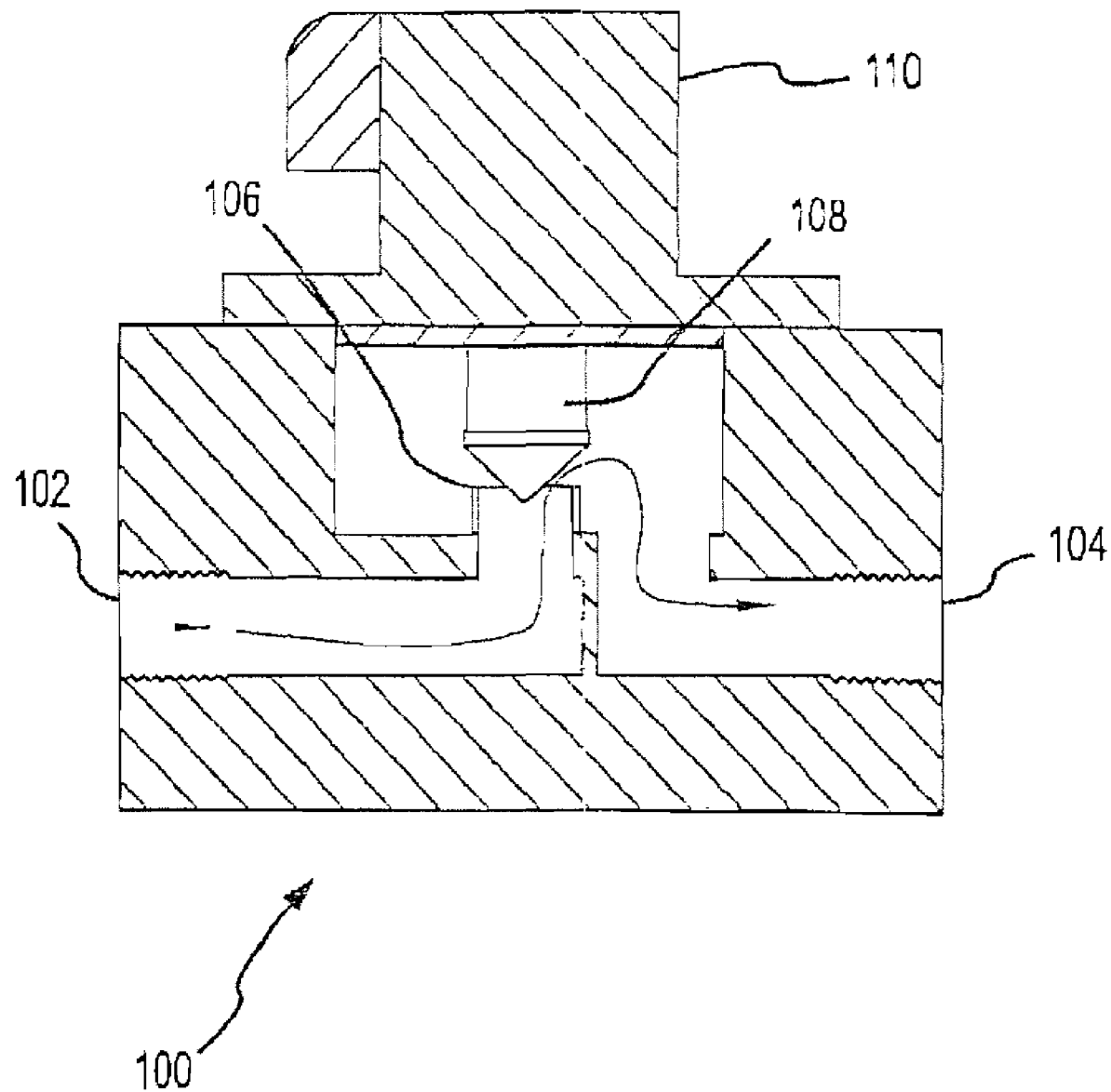
FIG. 3 illustrates one embodiment of a leaning valve utilized with the system of FIG. 1.

FIG. 3 shows one embodiment of the leaning valve 100. In the embodiment shown, the inlet 102 of the leaning valve 100 receives gas flow from the outlet 56 of the boost pressure valve 50. As shown, the leaning valve 100 has an inlet 102, an outlet 104, a valve seat 106, and a needle assembly 108. Interconnected to the needle valve 108 is a stepper motor 110. The stepper motor 110 is operative to, in response to signals received from the ECU 80, adjust the position of the needle assembly 108 in order to vary the volume of gaseous-fuel flow (i.e., as received from the boost-pressure valve 50) through the leaning valve 100 prior to being received by the air intake 36. In this regard, it should be noted that at high loads, dual-fuel fumigation systems often suffer from a lack of power. This is due in part to the fact that most gaseous-fuels contain less thermal energy than diesel fuel. Accordingly, at high loads the gaseous-fuel may not provide enough BTUs to the diesel engine 20 for efficient operation. In this regard, the flow of the gaseous-fuel may be restricted by the leaning valve 100.

That is, at high loads, the boost-pressure valve 50 is fully opened and the gaseous-fuel flow may be leaned to provide improved engine performance (i.e., resulting in higher diesel usage to maintain power output). Furthermore, the leaning valve 100 may be utilized to fine-tune the gaseous-fuel flow in order to achieve desired emission outputs. Of note, at such high load conditions, elevated temperature and pressure in the engine during the compression strokes of the pistons may make the intake air/gaseous-fuel mixture susceptible to premature detonation (i.e., engine knocking). Such engine knocking is an uncontrolled combustion process that can damage the engine. While such engine knocking may initially be of low intensity, oscillation (e.g., harmonic amplification) may occur resulting in the engine shaking an/or bouncing (i.e., rough engine operation). Discussed herein are systems and methods to reduce and/or eliminate such engine knocking.

As noted, the leaning valve 100 is operated by the ECU 80. In one arrangement, the ECU 80 utilizes the oxygen sensor 84, which is disposed in the exhaust output 38 of the engine 20, to generate control signals for adjusting the leaning valve 100. In this regard, the oxygen content of the exhaust gases is monitored by the oxygen sensor 84. The oxygen sensor 84 generates a signal based on this oxygen content, which signal is transmitted to the ECU 80. The ECU 80 may comprise any computer, logic, firmware, computer chip, microprocessor, and/or circuit board. In any case, the ECU 80 controls the operation of the leaning valve 100 in relation to the received oxygen signal. Accordingly, the ECU 80 monitors the signal from the oxygen sensor 84 at a predetermined rate.

Upon receipt of an oxygen signal showing an amount of oxygen below a desired amount in the exhaust conduit 38, the ECU 80 sends a control signal to the leaning valve 100, thereby causing the leaning valve 100 to advance the needle assembly 108 towards the valve seat 106, which provides a reduced gaseous-fuel flow to the air intake 36. Accordingly, this reduced gaseous-fuel flow to the air intake results in a leaner gaseous-fuel/intake air mixture. Conversely, upon receipt of an oxygen content signal showing an excess of oxygen in the exhaust conduit 38, the ECU 80 sends a control signal to the leaning valve 100 causing the needle assembly 108 to be opened relative to the valve seat 106. This causes an increased gaseous-fuel flow and thereby a richer gaseous-fuel/intake air mixture to be provided to the engine 20.

Another feature of the illustrated fumigation system 10 is the ability for a user to selectively control an oxygen set point for the ECU 80. That is, a user may control the oxygen content of the exhaust gas. In this regard, the ECU 80 includes an exhaust oxygen content adjuster 82 that may be set by a user to establish a desired oxygen content in the exhaust gases. As will be appreciated, engines from different manufacturers may run at different consumption and/or power levels. This is true even for engines having the same power rating (e.g., horsepower). For example, one 300 hp rated engine may run at 25 cubic feet of intake air per second, whereas another 300 hp rated engine may utilize 50 cubic feet of air per second. Likewise, these engines may have varying boost-pressure levels. Furthermore, there may also be variations in the thermal energy of the gaseous-fuel utilized with these engines. For example, there may be thermal energy and/or combustion differences between propane and natural gas. In this regard, the ability to select an oxygen level for the exhaust gases of a particular engine allows for adjusting the fumigation system 10 in accordance with a particular set of operating conditions that may be engine specific.

The oxygen sensor 84 allows the ECU 80 to ensure that the fuel provided to the engine 20 (i.e., diesel fuel and the gaseous-fuel) is more fully combusted. That is, if the oxygen level in the exhaust conduit 38 drops below a predetermined minimum, it is known that there is not enough oxygen within the intake air/gaseous-fuel mixture to completely combust the fuel. In this instance, fuel is being utilized inefficiently and hydrocarbons are passing unburned through the engine 20, which results in increased emissions. Accordingly, by adjusting the flow of the gaseous-fuel such that a predetermined minimum oxygen level is maintained within the exhaust output 38, more complete combustion of the diesel fuel and gaseous-fuel mixture is realized and emissions may be reduced.

Though the ECU 80 is discussed as being operable to control the fumigation system 10 with only a sensor input from the oxygen sensor 84, additional and/or different sensors may be utilized control the fumigation system and/or to enhance performance of the engine. For example, an exhaust gas temperature gauge 88 and RPM sensor 92 may be incorporated into the system 10 to control and/or fine-tune the operation of the fumigation system 10.

As noted above, in some instances an engine utilizing the gaseous-fuel fumigation system may experience engine knocking conditions. In order to identify such engine knocking conditions, the gaseous-fuel fumigation system also includes at least a first knock sensor 86 that is operatively connected to the engine 20. See FIG. 1. Further, it will be appreciated that a plurality of such knock sensors 86 may be utilized. The knock sensor 86 may take the form of an accelerometer (e.g., a piezoelectric sensor) that is attached to a solid surface of the engine 20 to provide feedback signals to the ECU 80. What is important is that the knock sensor be operative to generate an output that is indicative of engine motion (e.g., vibrations).

Generally, the knock sensor(s) may be attached to any location that provides a solid base though which engine vibrations may be detected. Such locations include, without limitation, the engine block and/or cylinder head. In one arrangement, knock sensors 86 may be disposed adjacent to each cylinder of the engine 20. It is intended that knock sensors 86 detect high motion frequency oscillations of pressure in the cylinders of engine 20 that can lead to mechanical breakdown of engine 20. As will be appreciated, all diesel engines produce a "rattling" sound when running. This is caused when the diesel fuel ignites upon injection into the combustion chamber. That is, the rapid combustion of the diesel fuel and intake air produces very high pressures generating a rumble or dull clattering sound. Accordingly, for purposes of identifying knocking conditions, it is engine motion/vibration (e.g., engine knocking) above the motion/vibration caused by the rattling of the diesel engine that needs to be identified by the knock sensor 86 and the ECU 80.

To identify such knocking conditions, knock sensors 86 may be connected to the engine 20 adjacent to corresponding cylinders. For each cylinder firing, the closest knock sensor 86 may be monitored over a specific time interval during which the output signals of the knock sensors are gathered/sampled by the ECU 80. That is, the ECU 80 may sample the outputs of the knock sensor(s) 86 and generate a baseline/threshold value(s) that is indicative of normal motion/vibration levels. As will be appreciated, such a threshold value may be generated utilizing a predetermined number of outputs samples of the knock sensor(s) 86. Further, such a threshold value may be continually updated. Stated otherwise, the threshold value may be a moving average. Alternatively and/or additionally, the ECU 80 may be operative to store one or more threshold values determined during operation of the engine 20 and/or utilize predetermined threshold values. For instance, such threshold values may be stored in a lookup table or other memory structure (e.g., equations) that are indexed to one or more engine operating parameters. A non-inclusive list of such parameters may include, exhaust oxygen level, engine rpm, exhaust temperature, gaseous fuel supply pressure, engine load and/or boost pressure.

Irrespective of whether the ECU 80 generates the threshold values and/or utilizes predetermined/stored threshold values, the ECU 80 is operative to compare output signals from the knock sensor(s) 86 to one or more threshold values. For instance, the ECU 80 may count the number of knock sensor outputs above a threshold value during a specific time period. If the number of outputs above the threshold value for the time period is unacceptable, remedial measures may be taken. In such circumstances, the ECU 80 adjusts the flow of gaseous fuel to the air intake 36 in response to identifying a predetermined number of outputs from the knock sensor(s) 86 that are above the threshold value (i.e., outputs indicating engine knocking conditions).

In one particular arrangement, upon identifying engine knocking conditions, the ECU 80 is operative to close the leaning valve 100 to shut off the flow of gaseous fuel to the air intake 36. Upon shutting the leaning valve 100, the ECU 80 immediately begins reopening the leaning valve 100 based on one or more current operating parameter (e.g., exhaust oxygen levels). This closing and reopening of the leaning valve 100 (i.e., cycling of the valve) allows for reestablishing proper operating conditions for the engine 20. That is, engine knocking conditions are eliminated and those conditions are generally eliminated prior to the engine oscillation (i.e., prior to visibly rough operation).

As will be appreciated, closing of the leaning valve 100 allows the engine 20 to briefly run in full diesel mode. As noted above, the cause of knocking in dual-fuel systems often stems from a rich/excessive gaseous fuel mixture at high load levels. That is, a lack of BTUs in the gaseous-fuel/intake air mixture at high load levels. Knock can also occur due to changes between gaseous fuel types as different gaseous fuels (e.g., natural gas and propane) may have different BTU values. Running in full diesel mode may eliminate the rich gaseous fuel condition. Further, the brief operation in full diesel mode allows the boost pressure valve position to stabilize for current operating conditions (e.g., changes in type of gaseous fuels, engine speed, etc.) as well as for oxygen levels in the exhaust stream to be established for the current operating conditions. Accordingly, when the ECU 80 reopens the leaning valve, the valve may be opened to reestablish a desired oxygen level in the exhaust stream. Due to the changes in the operating conditions, the leaning valve will typically reopen to a different position (e.g., gaseous fuel flow volume) than existed prior to the change in operating conditions. Though discussed in relation to fully closing the leaning valve 100 to correct knocking conditions, it will be appreciated that in some instances, substantially reducing the fuel flow though the leaning valve 100 may produce similar results. That is, the leaning valve 100 may, after the detection of knocking conditions, be closed to reduce gaseous fuel flow to a predetermined percentage of the pre-knocking fuel flow (e.g., 20%) and then be reopened. Such partial closure may, for some applications, be sufficient to eliminate knocking conditions and may also reducing cycling time. Accordingly such partial closure is considered within the scope of the present invention.

Figure 4:
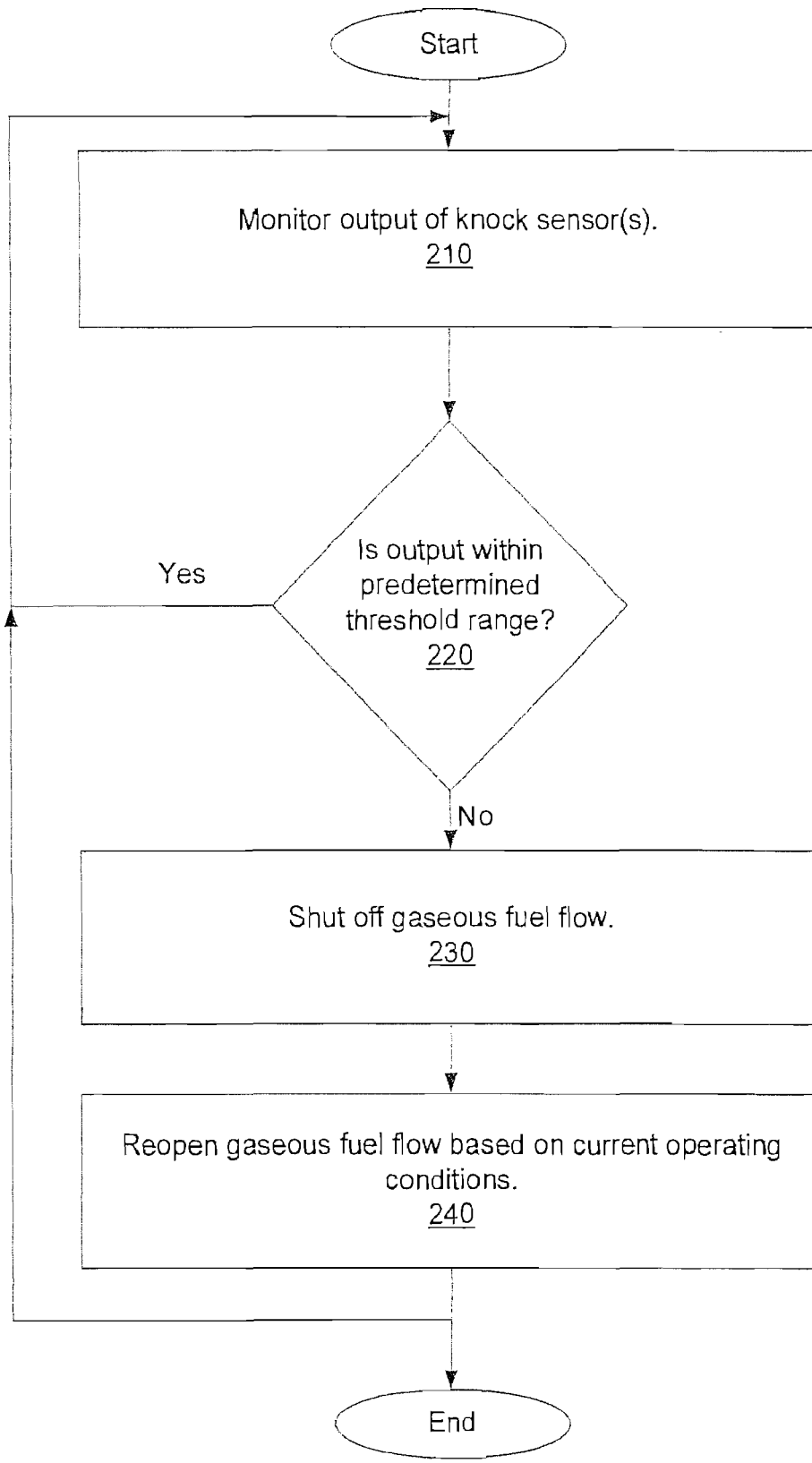
FIG. 4 illustrates a process that may be utilized with a fumigation system.

Referring to FIG. 4, a process for implementing the above-noted valve cycling to counteract engine knocking conditions is provided. Initially, the ECU 80 monitors (210) the output of the knock sensor(s) 86 over a predetermined period of time. The output of the knock sensor(s) 86 is compared (210) to at least a first threshold. If the output is below or within a predetermined amount of the threshold, monitoring continues. If the output is greater than the threshold or a predetermined percentage greater than the threshold (e.g., 1.2 times the threshold) it may be determined that engine knocking conditions exist. Once the determination is made that engine knocking conditions exist, the supply of gaseous fuel flow may be shut off (230) or substantially restricted to allow the engine to operate in full or near full diesel mode. Once the gaseous fuel is shut off/restricted (230) the gaseous fuel flow may be reopened (240) in accordance with current operating conditions. Likewise, monitoring (210) may continue until operation of the engine is terminated.

Figure 5:
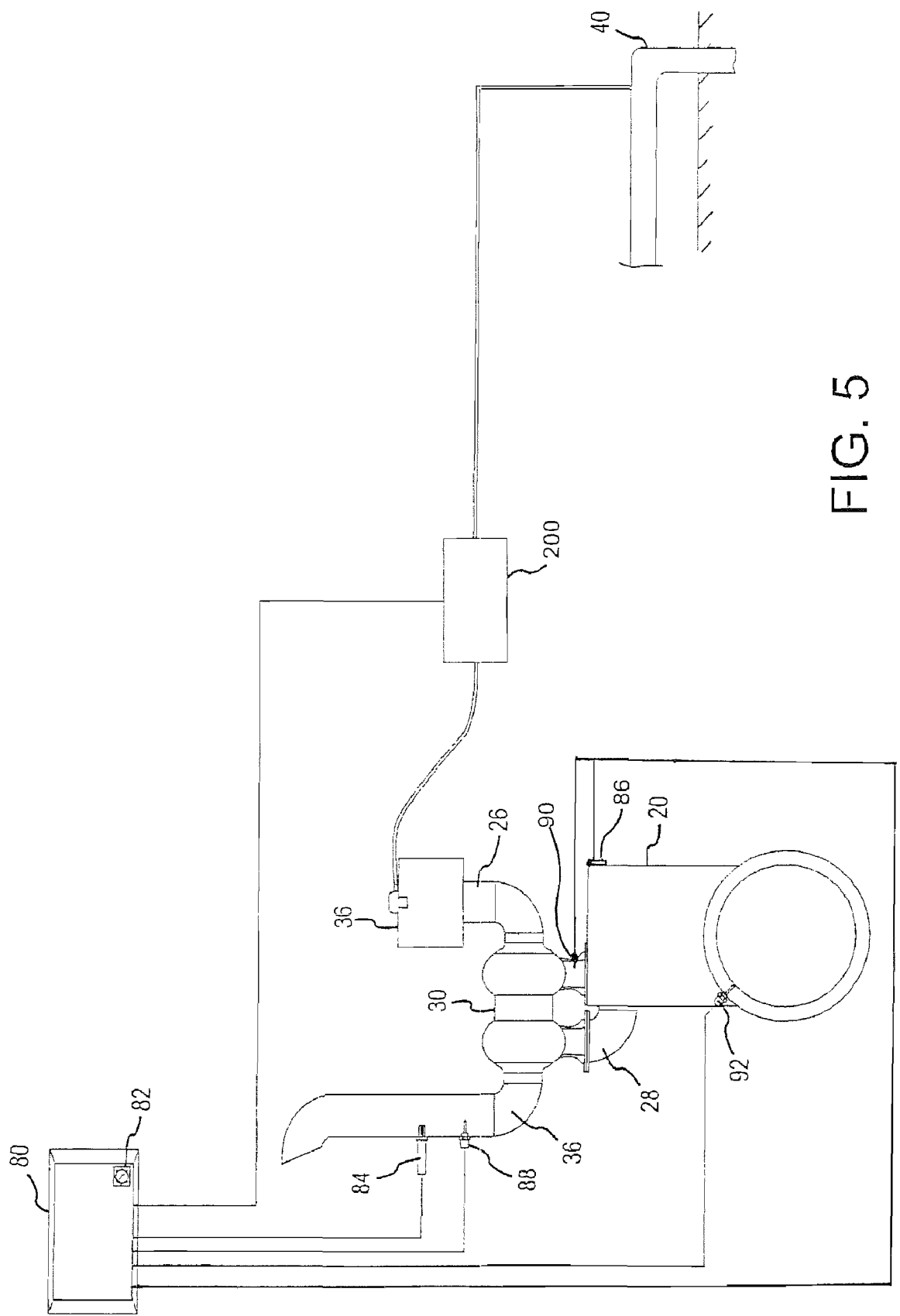
FIG. 5 illustrates a second embodiment of a fumigation system.

FIG. 5 shows another embodiment of the gaseous-fuel fumigation system 10. As shown, the second embodiment does not utilize the lock-off valve 46 or the boost-pressure valve 50. Rather, the system of FIG. 5 relies upon a single ECU controlled valve 200 to regulate the flow between the gas supply 40 and the air intake 36. Of note, in FIG. 5 the gas supply 40 is received from a gas well 44. In this regard, it will be appreciated the in the production of natural and methane gas, diesel engines are commonly utilized for pumping and compressing gas from wells into pipelines. In this regard, these diesel engines have a ready supply of natural gas that may be utilized with the above-noted systems. However, it will be appreciated that gas received from the well 44 may require dehydration and/or compression prior to use with the diesel engine 20. It will be further appreciated that the system of FIG. 5 may be utilized with other gas sources.

The dual-fuel fumigation system 10, as shown in FIG. 5, again utilizes an oxygen sensor 84 that is disposed within the exhaust output 38 of the engine 20. However, in this embodiment, the dual-fuel fumigation system 10 utilizes a pressure sensor 90 that is fluidly interconnected to the output stream of the turbocharger 30. Accordingly, the pressure sensor 90 may provide an output that is indicative of the input pressure (e.g., boost pressure) into the engine 20.

The sensor 90 may be any sensor that is operative to generate an output signal that is indicative of pressure. Non-limiting examples of such a sensor include pressure transducers such as diaphragm transducers, strain gage transducers and/or piezoelectric transducers. In any case, the pressure sensor 90 is electrically interconnected to the ECU 80. In this regard, the output of the sensor 90 is provided to the ECU 80, which may then utilize the signal from the pressure sensor 90 to generate a pressure value. The controller may then generate a control signal for controlling the valve 200 and thereby regulate the fluid flow between the gas supply 40 and the air intake 36 based on the input pressure of the engine. In addition, the ECU 80 may utilize the output signal from the pressure sensor 90 in conjunction with the output signal from the oxygen sensor 84 (i.e., that is indicative of the oxygen content of the engine exhaust) in order to control the valve 200 based on both (e.g., a combination) engine input pressure and exhaust oxygen content. The ECU 80 can also use pressure from the sensor 90 to adjust the oxygen set point up or down to achieve a non-linear result of gaseous fuel flow. Alternatively, the ECU 80 may be programmed to provide linear increases of gaseous fuel based on input pressure from the sensor 90. In either arrangement, limitations may be imposed by exhaust oxygen presets. This allows for proportional or non-proportional fuel flows as may be required by a specific application.

Figure 6:
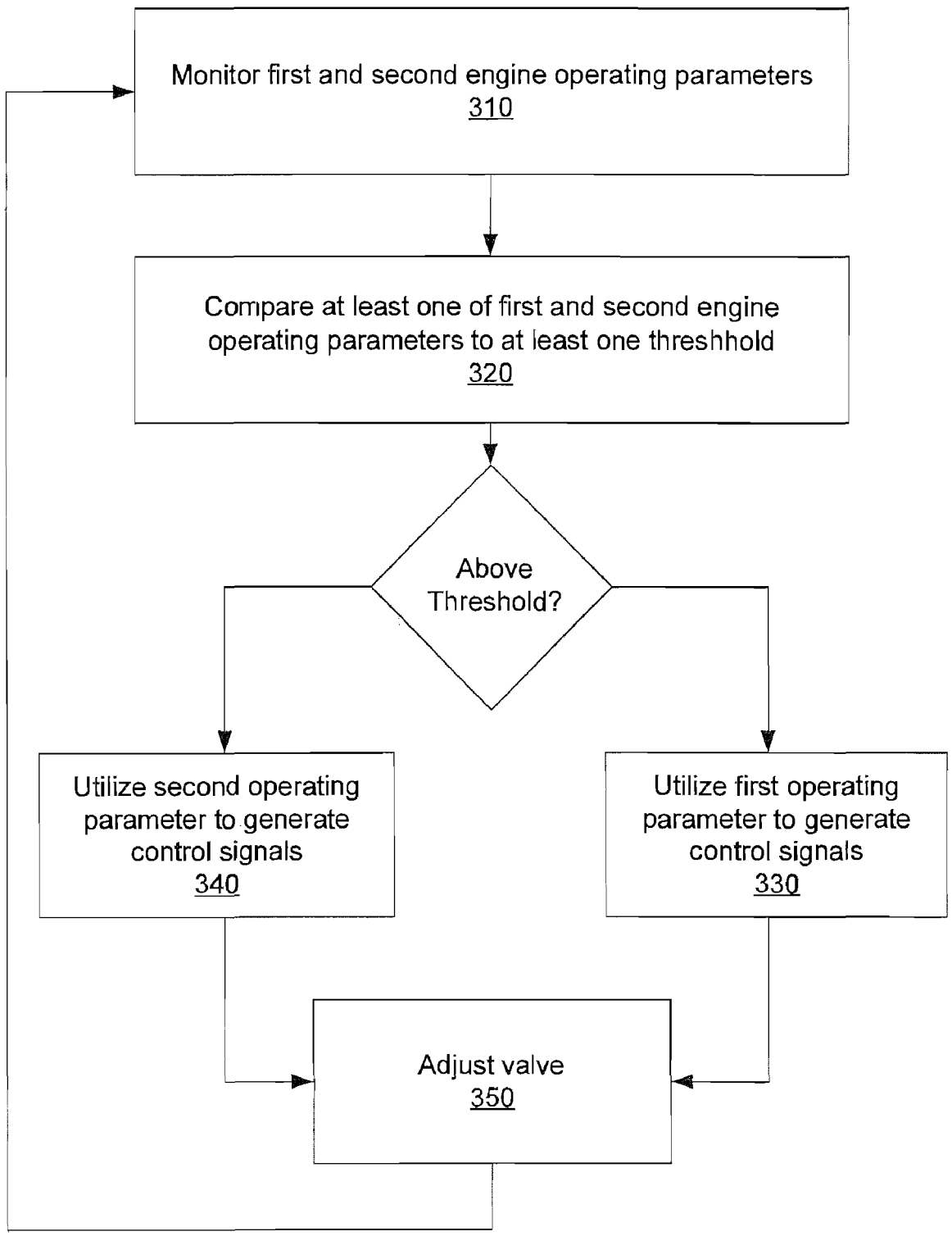
FIG. 6 illustrates a process that may be utilized with the fumigation system of FIG. 5.

FIG. 6 illustrates a process in accordance with the embodiment of FIG. 5. Initially, the ECU 80 monitors (310) the output signals of first and second engine parameter sensors, which in the present embodiment are the pressure sensor 90 and oxygen sensor 84. The ECU 80 then compares (320) at least one of the signals with a reference value/threshold. In this regard, comparing may include use of the signals with predetermined equations to determine, for example, oxygen content values and/or pressure values. In the present arrangement, when the oxygen value of the exhaust stream is above a predetermined minimum (i.e, threshold value), the controller may utilize primarily or entirely the signals from the pressure sensor 90 (e.g., pressure values) to generate (330) control signals for setting the valve 200. That is, the controller computes a desired gaseous fuel flow rate based primarily on the intake pressure. Accordingly, the ECU 80 the valve control signals that are relayed to the valve 200 and an actuator associated with the valve 200 then adjusts (350) the valve 200 in accordance with the signals from the ECU 80 to establish a desired gaseous fuel flow rate. Alternatively, when the oxygen content of the exhaust stream is below a predetermined minimum, the controller may utilize primarily or entirely the signals form the oxygen sensor 84 to generate (340) control signals for setting the valve 200. For instance, the oxygen level dropping below the predetermined minimum may indicate that excess gaseous fuel is present and the controller may generate control signals to restrict the valve 200 and thereby reduce the gaseous fuel flow to the engine. This may reestablish a desired oxygen content to the exhaust stream and may thereby result in subsequent operation based on the pressure sensor.

Of note, the embodiment of FIG. 5 may also incorporate the knock sensor 86, as discussed above. In this regard, it will be appreciated that the utilization of the knock sensor may be incorporated into the single valve embodiment of FIG. 5 as well. That is, the valve 200 may be cycled (e.g., between open and substantially closed positions) to account for knocking conditions.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A gaseous-fuel fumigation system for use with a diesel engine, comprising:
   a valve disposable in a flow path between a gaseous-fuel supply and an air intake stream of a diesel engine, the valve being operative to regulate a flow volume of a gaseous-fuel through the flow path;
   a pressure sensor operative to generate a pressure signal indicative of a pressure level of the air intake stream of the diesel engine;
   an oxygen sensor operative to generate an oxygen content signal indicative of an oxygen content of an exhaust stream of the diesel engine; and
   a controller operative to:
      receive the pressure signal and the oxygen content signal;
      compute a desired gaseous fuel flow volume based on the pressure level and the oxygen content; and
      generate valve control signals for operating the valve to establish the desired gaseous fuel flow volume through the flow path.

2. The system of claim 1, further comprising:
   an actuator associated with the valve, wherein the actuator is operative to receive the valve control signals and move the valve to establish the desired gaseous fuel flow volume through the valve.

3. The system of claim 1, wherein the pressure sensor is located on an output side of a turbocharger of the engine.

4. The system of claim 3, wherein the pressure sensor comprises a pressure transducer fluidly connected to the output side of the turbocharger.

5. The system of claim 1, further comprising:
   a knock sensor operative to monitor a motion level of the diesel engine and generate a motion signal indicative of the motion level.

6. The system of claim 5, wherein the controller is further operative to:
   receive the motion signal from the knock sensor;
   compare the motion signal to at least a first threshold value; and
   upon the motion signal exceeding the first threshold value generate a first control signal operative to move the valve to a substantially closed position to substantially eliminate gaseous fuel flow through the valve and a second control signal operative to move the valve to a reopened position to reestablish a gaseous fuel flow through the valve.

7. The system of claim 6, wherein the knock sensor is a piezoelectric device.

8. The system of claim 1, wherein the gaseous-fuel supply comprises at least one of:
   natural gas;
   methane gas;
   propane;
   hydrogen;
   vaporized ethanol; and
   vaporized methanol.

9. The system of claim 1, wherein the gaseous-fuel supply comprises a gas well.

10. The system of claim 1, wherein the desired gaseous fluid flow volume maintains a predetermined oxygen content in the exhaust stream.

11. A method for use with gaseous-fuel fumigation system attached to a diesel engine, comprising:
    establishing a gaseous-fuel flow through a valve disposed between a gaseous-fuel supply and an air intake stream of a diesel engine, wherein the valve is operative for regulating a volume the gaseous-fuel flow;
    monitoring an inlet pressure of the diesel engine;
    monitoring an exhaust oxygen content of the diesel engine;
    based on the inlet pressure and the exhaust oxygen content, adjusting the valve to regulate the flow volume of the gaseous-fuel through the flow path.

12. The method of claim 11, wherein adjusting the valve comprises one of increasing and decreasing the flow volume through the valve to maintain a predetermined oxygen content in the exhaust stream.

13. The method of claim 11, further comprising:
monitoring a motion level of the engine;
upon the motion level exceeding at least one threshold value, substantially closing and reopening the valve, wherein the gaseous fuel flow to the air intake is temporarily interrupted.

14. The method of claim 13, wherein the valve is substantially closed and reopened in a substantially continuous movement.

15. The method of claim 13, wherein substantially closing and reopening the valve further comprises:
generating a first valve control signal operative to move the valve from an initial valve position defining a first gaseous-fuel flow volume to a substantially closed position defining a second gaseous-fuel flow volume; and
generating a second valve control signal operative to move the valve from the substantially closed position to a reopened position defining a third gaseous-fuel flow volume.

16. The method of claim 11, further comprising:
comparing the oxygen content to at least one threshold value, wherein said valve is adjusted based on the inlet pressure when said oxygen content is above said threshold value and said valve is adjusted based on the oxygen content when said oxygen content is below said threshold value.

17. The method of claim 16, wherein the first gaseous-fuel flow volume and the third gaseous-fuel flow volume are different.

18. The method of claim 16, further comprising:
adjusting said at least one threshold value based on at least a first operating condition of said engine.

19. The method of claim 18, wherein different threshold values allow for non-linear adjustment of the gaseous fuel flow.

* * * * *